UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

METHOD OF TREATING SOLID BY-PRODUCTS OF THE ANIMAL KINGDOM OF MORE OR LESS FIBROUS STRUCTURE.

1,087,904. Specification of Letters Patent. Patented Feb. 17, 1914.

No Drawing. Application filed August 24, 1912. Serial No. 716,861.

*To all whom it may concern:*

Be it known that I, ALBERT H. HENDERSON, a citizen of the United States, residing at Baltimore, in the State of Maryland, have invented a new and useful Method of Treating Solid By-Products of the Animal Kingdom of More or Less Fibrous Structure, of which the following is a specification.

My invention proposes the use as hereinafter described of solid by-products of the animal kingdom of more or less fibrous structure such as the intestinal, articular, integumental, epidermic, muscular or cartilaginous substances of terrestrial or aquatic mammals or creatures, all of which substances are adapted to the treatment and the production of the composition of matter hereinafter set forth.

Of the various by-products of the animal kingdom, examples of which are above given, certain are capable, without any combination or treatment therewith of rubber, of being made to constitute a substance practically undistinguishable from rubber itself, having the characteristics heretofore supposed to be inherent to and distinctive only of rubber; but inasmuch as it is my intention to use a large class of such by-products of the animal kingdom, in the selection of which questions of supply, cheapness and the like arise, it may be found necessary or advisable in some cases, in order to obtain the fullest characteristics of rubber, to combine or impregnate such by-products with rubber preferably in the form of a rubber solution.

As a specific example of an animal by-product favorable to my method, the cartilaginous material derived from sharks may be selected. Such by-product is taken in its natural condition—in which when dry it possesses great density, or a hardness almost equal to that of rock or stone—and placed in a solution of say three to five per cent. salt in water, combined with an oily substance, as glycerin and water, in a ratio of say one to three. This immersion is continued for a length of time suited to the peculiar degree of induration possessed by the by-product, say from two to ten days, or until it has attained maximum expansion. The said by-product is thus brought to a permanently porous or spongy state, and after it has been removed from the aforesaid mixture it is immersed in a bath of a vegetable or an animal oil, preferably one of the creosoted or turkey red oils, or a derivative thereof, said oil bath being heated to a temperature of from 70 to 90 degrees C. By the action of this oil the natural fluidity or moisture, surplus water, and whatever has a volatility less than that of the glycerin, together with the excess of the glycerin absorbed by the pores, are expelled from the by-product. From five to nine hours may be required in this action and the drying operation. The by-product, so far treated, is now cut into comparatively small particles, which by means of heated rolls, calenders or other appropriate mechanical appliances, are pressed, amalgamated or united into a sheet adapted for commercial purposes, or to be cut up to such size or shape or to be given such form, as may be required for a salable article. Thus treated, and without any union with rubber, the by-product is found to be undistinguishable from that substance, possessing its flexibility and elasticity, and being with it capable of vulcanization. The treated by-product having its pores sufficiently charged with the glycerin, and its component parts amalgamated, coalesced, or united as one body by suitable pressure, is possessed of great toughness, durability and elasticity and forms in itself an article of commerce or artificial rubber adapted to a variety of uses. Some of the by-products after such coalescence may preferably be subjected to cutters or agitators and thereby reduced to small grains, shreds or particles which are thereafter thoroughly mixed and kneaded by suitable machinery. This operation under conditions existing in certain of the by-products facilitates the ultimate more perfect consolidation of the body which may be effected by running it through rolls whereby it is or may be shaped to the demands of general use in manufacture.

The by-product in its natural state may first be subjected to a suitable moistening device of the humidor class for a length of time suited to the peculiar degree of hardness possessed by it in order to render it somewhat flexible and elastic, and afterward cut into slugs or strips, or brought to fragmentary, granulated or shredded condition.

My invention thus far explained presupposes the utilization of the higher or specially-adapted grades of by-products, the natural characteristics of which are such as to enable them to yield to the actions above described. But with a by-product of a lower or different grade, the characteristics of which are such that the elasticity desired cannot be adequately obtained without the combination or treatment of the by-product with rubber, I run the by-product, thus formed into a solid substance, through heated rolls in the presence of an admixture of sulfur and other vulcanizing agents, after which the mass may be rolled out by calenders or hot presses in order to be shaped to the demands of general use in manufacture, and especially for vulcanization when combined or impregnated with rubber.

The rubber may be combined with the open pores of the by-product at any suitable stage, the impregnation, saturation or similar rubber treatment being by preference preliminary to the bringing of the body to such shape as may be desired for use in the arts, the vulcanization of the rubber being provided for by the presence of the vulcanizing materials admitted to the by-product. The rubber is preferably united with or applied to the porous by-product in the form of a liquid solution by either a cold or heated process, as for example, in a vat, either cold or heated; and a vulcanizing agent, as sulfur in proper proportion and suitable form, may be mixed with the rubber-impregnated material, as by being fed from a hopper or other receptacle to rollers or other media by which the substance may be united in fit condition for future vulcanization.

Among the rubber substitutes applicable for my use is an important and growing class of compounds artificial in character, while others are natural products. Furthermore, with the rubber, however used, any of these substitutes or reclaimed rubbers, in smaller or larger quantities, may be employed. The vulcanizing agents when used not only fit the treated by-product for union or amalgamation with rubber, but seal its open pores and consequently aid in preventing escape or dissipation of the glycerin with which the by-product is virtually impregnated.

I herein make no claim to the product, or to the combinations of matter described.

Having thus described my invention, I claim:—

1. The herein described method of treating a solid by-product of the animal kingdom of more or less fibrous structure, the same consisting in placing said by-product while in its natural condition in a solution of salt in water combined with a mixture of water and glycerin, and subsequently immersing said by-product in a bath of heated oil whereby natural fluidity or moisture, surplus water and the excess of glycerin absorbed by the pores thereof are expelled, substantially as set forth.

2. The herein described method of treating a solid by-product of the animal kingdom of more or less fibrous structure, the same consisting in placing said by-product while in its natural condition in a solution of salt in water combined with a mixture of water and glycerin, subsequently immersing said by-product in a bath of heated oil whereby natural fluidity or moisture, surplus water and the excess of glycerin absorbed by the pores thereof are expelled, thereafter cutting the treated by-product into small particles, and pressing or forming the same into a consolidated body, substantially as set forth.

3. The herein described method of treating a solid by-product of the animal kingdom of more or less fibrous structure, the same consisting in placing said by-product in its natural condition in a solution of salt in water combined with a mixture of water and glycerin, subsequently immersing said by-product in a bath of heated oil whereby natural fluidity or moisture, surplus water and the excess of glycerin absorbed by the pores thereof are expelled, thereafter cutting said treated by-product into small particles and pressing or amalgamating the same into a consolidated body, and after such amalgamation dividing said body into minute particles and thoroughly mixing and kneading the same, and finally rolling the mixed and kneaded body into a sheet, substantially as set forth.

4. The herein described method of treating a solid by-product of the animal kingdom of more or less fibrous structure, the same consisting in placing said by-product while in its natural condition in a solution of salt in water combined with a mixture of water and glycerin, subsequently immersing the said by-product in a bath of heated oil whereby natural fluidity or moisture, surplus water and the excess of glycerin absorbed by the pores thereof are expelled, separating the by-product into comparatively small particles, and subjecting them to pressure in the presence of heat and vulcanizing ingredients, substantially as set forth.

5. The herein described method of treating a solid by-product of the animal kingdom of more or less fibrous structure, the same consisting in placing said by-product while in its natural condition in a solution of salt in water combined with a mixture of water and glycerin, subsequently immersing the said by-product in a bath of heated oil whereby natural fluidity or moisture, surplus water and the excess of glycerin absorbed by the pores thereof are expelled, separating the by-product into comparatively small particles, subjecting them to pressure in the presence of heat and vulcanizing ingredients, immersing the by-product in a rubber solution, and finally vulcanizing the treated body, substantially as set forth.

6. The herein described method of treating a solid by-product of the animal kingdom of more or less fibrous structure, the same consisting in moistening said by-product when in its natural state, but in dry and indurated form, so as to render it flexible and elastic, placing the same in a solution of salt in water combined with a mixture of water and glycerin, immersing the same in a bath of heated oil whereby natural fluidity or moisture, surplus water and excess of glycerin absorbed by the pores of said by-product are expelled, separating said by-product into small particles and subjecting them to pressure in the presence of heat and vulcanizing ingredients.

7. The herein described method of treating a solid by-product of the animal kingdom of more or less fibrous structure, the same consisting in moistening said by-product when in its natural state but in dry and indurated form so as to render it flexible and elastic, placing the same in a solution of salt in water combined with a mixture of water and glycerin, immersing the same in a bath of heated oil whereby natural fluidity or moisture, surplus water and excess of glycerin absorbed by the pores of said by-product are expelled, separating the by-product into small particles and subjecting them to pressure in the presence of heat and vulcanizing ingredients, and vulcanizing the treated body.

8. The herein described method of treating a solid by-product of the animal kingdom of more or less fibrous structure, the same consisting in moistening said by-product when in its natural state but in dry and indurated form so as to render it flexible and elastic, placing the same in a solution of salt in water combined with a mixture of water and glycerin, immersing the same in a bath of heated oil whereby natural fluidity or moisture, surplus water and excess of glycerin absorbed by the pores of said by-product are expelled, separating the by-product into small particles and subjecting them to pressure in the presence of heat and vulcanizing ingredients, immersing the by-product in a rubber solution, and vulcanizing the treated body, substantially as set forth.

9. The herein described method of treating a solid by-product of the animal kingdom of more or less fibrous structure, the same consisting in subjecting the said by-product to a saline solution in the presence of a mixture of water and glycerin and eliminating therefrom whatever of fluid nature that has volatility less than that of the glycerin by immersing the by-product in a bath of heated oil, substantially as set forth.

10. The herein described method of treating a solid by-product of the animal kingdom of more or less fibrous structure, the same consisting in rendering said by-product flexible and elastic by moisture, reducing the same to fragmentary condition, placing the same in a saline solution in the presence of a mixture of water and glycerin and eliminating whatever of fluid nature that has volatility less than that of the glycerin by immersing the by-product in a bath of heated oil, and solidifying the fragmentary by-product by rolling in the presence of heat, substantially as set forth.

11. The herein described method of treating a solid by-product of the animal kingdom of more or less fibrous structure, the same consisting in subjecting the said by-product to a saline solution in the presence of a mixture of water and glycerin and eliminating whatever of fluid nature that has volatility less than that of the glycerin by immersing the by-product in a bath of heated oil, and rolling said treated by-product in the presence of heat, substantially as set forth.

12. The herein described method of treating a solid by-product of the animal kingdom of more or less fibrous structure, the same consisting in subjecting the said by-product to a saline solution in the presence of a mixture of water and glycerin, eliminating whatever of fluid nature that has volatility less than that of the glycerin by immersing the by-product in a bath of heated oil, and rolling the same in the presence of heat and vulcanizing agents, substantially as set forth.

13. The herein described method of treating a solid by-product of the animal kingdom of more or less fibrous structure, the same consisting in subjecting the said by-product to a saline solution in the presence of a mixture of water and glycerin, eliminating whatever of fluid nature that has volatility less than that of the glycerin by immersing the by-product in a bath of heated oil, rolling the same in the presence of heat and vulcanizing agents, and vulcanizing the treated body, substantially as set forth.

14. The herein described method of treating a solid by-product of the animal kingdom of more or less fibrous structure, the same consisting in subjecting the said by-product to a saline solution in the presence of a mixture of water and glycerin, eliminating whatever of fluid nature that has volatility less than that of the glycerin by immersing the by-product in a bath of heated oil, immersing the treated by-product in a rubber solution, rolling the same in the presence of vulcanizing agents, and finally vulcanizing the treated body, substantially as set forth.

In testimony whereof I affix my signature in presence of two witnesses.

ALBERT H. HENDERSON.

Witnesses:
JAMES F. JOHNSON,
C. HOWARD MILLIKIN.